US 7,647,626 B2

(12) United States Patent
Bird et al.

(10) Patent No.: US 7,647,626 B2
(45) Date of Patent: *Jan. 12, 2010

(54) METHOD FOR ESTABLISHING A TRUSTED RELATIONSHIP BETWEEN A DATA SERVER AND A MIDDLEWARE SERVER

(75) Inventors: Paul Miller Bird, Markham (CA); Curt Lee Cotner, Gilroy, CA (US); Walid Rjaibi, Markham (CA); Timothy Jon Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 745 days.

This patent is subject to a terminal disclaimer.

(21) Appl. No.: 11/008,507

(22) Filed: Dec. 8, 2004

(65) Prior Publication Data

US 2006/0123468 A1    Jun. 8, 2006

(51) Int. Cl.
*G06F 7/04* (2006.01)
*G06F 15/16* (2006.01)
*G06F 17/30* (2006.01)
*H04L 29/06* (2006.01)

(52) U.S. Cl. .................... 726/5; 726/2; 726/3
(58) Field of Classification Search .............. 726/2, 726/3, 5
See application file for complete search history.

(56) References Cited

U.S. PATENT DOCUMENTS

| | | | | |
|---|---|---|---|---|
| 5,586,260 | A | 12/1996 | Hu .......................... 395/200.2 |
| 5,598,536 | A * | 1/1997 | Slaughter et al. ............ 709/219 |
| 5,619,657 | A * | 4/1997 | Sudama et al. .............. 709/225 |
| 5,841,869 | A | 11/1998 | Merkling et al. |
| 6,052,785 | A | 4/2000 | Lin et al. .................... 713/201 |
| 6,076,092 | A | 6/2000 | Goldberg et al. ............ 707/103 |
| 6,112,196 | A | 8/2000 | Zimowski et al. .............. 707/2 |
| 6,212,636 | B1 * | 4/2001 | Boyle et al. ................. 713/168 |
| 6,266,666 | B1 | 7/2001 | Ireland et al. ................. 707/10 |
| 6,286,104 | B1 | 9/2001 | Buhle et al. ................. 713/201 |
| 6,349,338 | B1 * | 2/2002 | Seamons et al. ........... 709/229 |
| 6,377,994 | B1 * | 4/2002 | Ault et al. ................... 709/229 |

(Continued)

OTHER PUBLICATIONS

Park, J. S. and Sandhu, R. 2000. Secure Cookies on the Web. IEEE Internet Computing 4, 4 (Jul. 2000), 36-44.*

(Continued)

*Primary Examiner*—Christian LaForgia
*Assistant Examiner*—James Turchen
(74) *Attorney, Agent, or Firm*—Sughrue Mion, PLLC

(57) ABSTRACT

A data server of a data processing system is operably coupled to a database and in communication with a middleware server. A connection between the data server and the middleware server is established and managed. A set of attributes identifying trusted middleware servers is instituted with the data server. The middleware server transmits a connection request to the data server. The connection request has request attributes including identifying the connection request as being for a new connection or reuse of an existing connection with different connection request attributes. A connection with the middleware server is established by the data server based on the connection request. A connection status message is received by the middleware server from the data server indicating a status of the connection request. A trust indicator for the connection is established at the data server according to a trust status identified by the set of attributes for the middleware server.

36 Claims, 8 Drawing Sheets

U.S. PATENT DOCUMENTS

| | | | |
|---|---|---|---|
| 6,434,543 B1 | 8/2002 | Goldberg et al. | 707/2 |
| 6,516,416 B2* | 2/2003 | Gregg et al. | 726/8 |
| 6,631,371 B1 | 10/2003 | Lei et al. | |
| 6,745,332 B1* | 6/2004 | Wong et al. | 726/4 |
| 7,174,565 B2* | 2/2007 | Kadyk et al. | 726/12 |
| 7,181,764 B2* | 2/2007 | Zhu et al. | 726/4 |
| 7,325,246 B1* | 1/2008 | Halasz et al. | 726/2 |
| 2002/0016777 A1* | 2/2002 | Seamons et al. | 705/76 |
| 2002/0049914 A1 | 4/2002 | Inoue et al. | 713/201 |
| 2002/0065956 A1 | 5/2002 | Yagawa et al. | 709/330 |
| 2002/0184217 A1* | 12/2002 | Bisbee et al. | 707/9 |
| 2003/0014527 A1 | 1/2003 | Terwindt et al. | 709/227 |
| 2003/0236975 A1 | 12/2003 | Birk et al. | |
| 2004/0064335 A1* | 4/2004 | Yang | 705/1 |
| 2006/0075075 A1 | 4/2006 | Malinen et al. | |

OTHER PUBLICATIONS

Chadwick, D. W., Otenko, A., and Ball, E. 2003. Role-Based Access Control With X.509 Attribute Certificates. IEEE Internet Computing 7, 2 (Mar. 2003), 62-69.*

Kristol, D. and Montulli, L. 1997 HTTP State Management Mechanism. RFC. RFC Editor.*

* cited by examiner

METHOD FOR ESTABLISHING A TRUSTED RELATIONSHIP BETWEEN A DATA SERVER AND A MIDDLEWARE SERVER

FIELD OF THE INVENTION

The present invention relates to the field of establishing a trusted relationship between a data server and a middleware server.

BACKGROUND

Access to sensitive data in a database is often managed by relying on the use of user identifications and passwords. If a user desires access to data in the database, a user id and password are often checked to determine if the user is registered to access data from the database. If the user is registered and the correct password has been provided then a connection with the database may be established.

Frequently, access to databases relying on user ids and passwords originate from a few primary locations. However, in such a case multiple user ids may access this data from the same location. Since these locations may be known and trusted, there may not be a requirement to authenticate every different user id and password for these locations.

SUMMARY

In accordance with an aspect of the present invention there is provided for a data server of a data processing system operably coupled to a database, a method of managing a connection with a middleware server, the middleware server sending a request for a connection to the data server, the request comprising request attributes, the method comprising: instituting a set of attributes identifying trusted middleware servers with the data server; establishing a connection with the middleware server based on a request therefrom; and establishing a trust indicator for the connection according to a trust status identified by the set of attributes for the middleware server.

In accordance with an aspect of the present invention there is provided for a middleware server of a data processing system, a method of establishing a connection with a data server operably coupled to a database, the method comprising: transmitting a connection request to the data server, the connection request having request attributes including identifying the connection request as being for a new connection or reuse of an existing connection with different connection request attributes; and receiving a connection status message from the data server indicating a status of the connection request.

In accordance with an aspect of the present invention there is provided for a data server of a data processing system operably coupled to a database, a computer program product for managing a connection with a middleware server, the middleware server sending a request for a connection to the data server, the request comprising request attributes, the computer program product comprising: a computer readable medium for tangibly transporting computer executable code to the middleware server, the computer executable code comprising: code for instituting a set of attributes identifying trusted middleware servers with the data server; code for establishing a connection with the middleware server based on a request therefrom; and code for establishing a trust indicator for the connection according to a trust status identified by the set of attributes for the middleware server.

In accordance with an aspect of the present invention there is provided for a middleware server of a data processing system, a computer program product for establishing a connection with a data server operably coupled to a database, the computer program product comprising: a computer readable medium for tangibly transporting computer executable code to the middleware server, the computer executable code comprising: code for transmitting a connection request to the data server, the connection request having request attributes including identifying the connection request as being for a new connection or reuse of an existing connection with different connection request attributes; and code for receiving a connection status message from the data server indicating a status of the connection request.

A data server of a data processing system is operably coupled to a database and in communication with a middleware server. A connection between the data server and the middleware server is established and managed. A set of attributes identifying trusted middleware servers is instituted with the data server. The middleware server transmits a connection request to the data server. The connection request has request attributes including identifying the connection request as being for a new connection or reuse of an existing connection with different connection request attributes. A connection with the middleware server is established by the data server based on the connection request. A connection status message is received by the middleware server from the data server indicating a status of the connection request. A trust indicator for the connection is established at the data server according to a trust status identified by the set of attributes for the middleware server.

Other aspect and features of the present invention will become apparent to those ordinarily skilled in the art upon review of the following description of embodiments of the invention in conjunction with the accompanying figures.

BRIEF DESCRIPTION OF THE DRAWINGS

The present invention will be described in conjunction with the drawings in which.

DETAILED DESCRIPTION

Figure 1A:
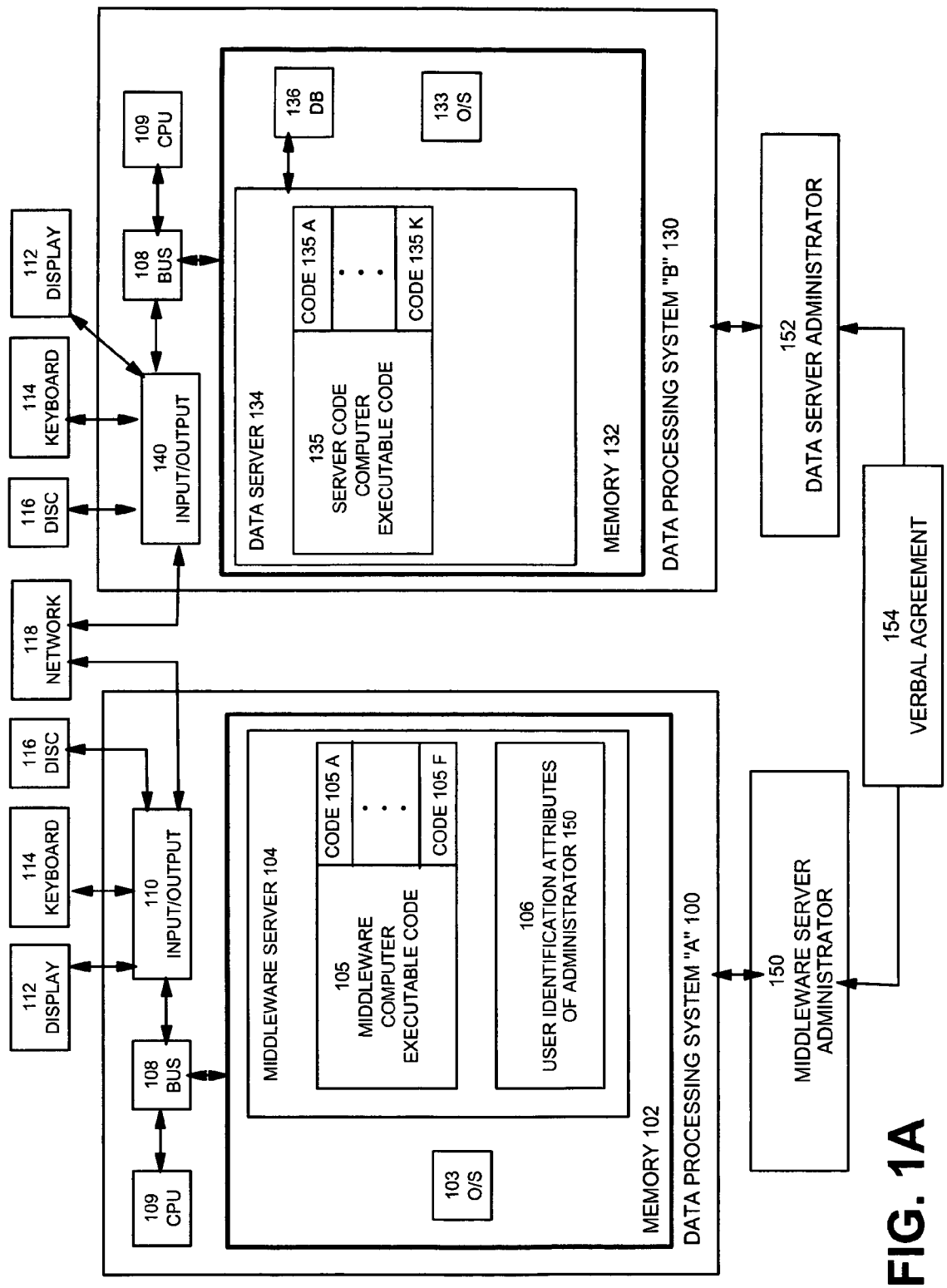
FIGS. 1A and 1B show a data server operatively coupled to a middleware server.

FIG. 1A shows two data processing systems (A 100 and B 130) in operable communication via network 118. Both data processing systems 100 and 130 contains a bus 108 that operatively couples a central processing unit (CPU) 109, an input/output interface 110 and a memory 102/132. The input/output interface 110 manages communications between the bus 108 and a display 112, a keyboard 114, a disc 116 and the network 118 for each of the data processing systems 100 and 130.

The memory 132 of data processing system B 130 includes a data server 134, a database 136 operatively coupled to the data server 134, and an operating system 133. The data server 134 may be, for example, an information retrieval system of a database management system. The data server 134 includes computer executable code 135 with a collection of modules 135A to 135K. These modules 135A to 135K perform functions (when compiled and executed) that compose a data server method. The functions of the data server method may include using the network 118 to communicate with data processing system A 100. In an alternate embodiment, the database 136 may be located in another data processing system, in which case, the data processing system B 130 may use the network 118 for communication with the database 136.

The memory 102 of the data processing system A 100 includes a middleware server 104 and an operating system 103. The middleware server 104 includes computer executable code 105 with a collection of modules 105A to 105K. These modules 105A to 105K perform functions (when compiled and executed) that compose a middleware server method. The functions of the modules 105A to 105K may include directing the middleware server 104 to negotiate for data with the data server 134.

The data server 134 of the data processing system B 130 acts as an intermediary between the database 136 and the middleware server 104.

A data server administrator 152 administers the data server 134 according to a verbal agreement 154. A middleware server administrator 150 administers the middleware server 104 according to the verbal agreement. The verbal agreement 154 contains an agreement between the data server administer 152 and the middleware server administer 150 regarding the characteristics of connections and data transfers between the middleware server 104 and the data server 134. For example, the verbal agreement 154 may set forth that the data server 134 is to be set up such that connection requests from the middleware server 104 received thereat are treated by the database 136 as trusted connection. To perform such an exemplary set up, the data server administrator 152 registers (in the database 136, for example) connection trust attributes that are associated with the trusted connections. The connection trust attributes may include a user id associated with a trusted connection, an IP (internet protocol) address of data processing system from which connection requests are received, or other attributes. The middleware server 104 includes user identification attributes 105 for the middleware server administrator 140.

It will be appreciated that the middleware server 104, the data server 134 and the database 136 may be present on the same or on different data processing systems.

Figure 1B:
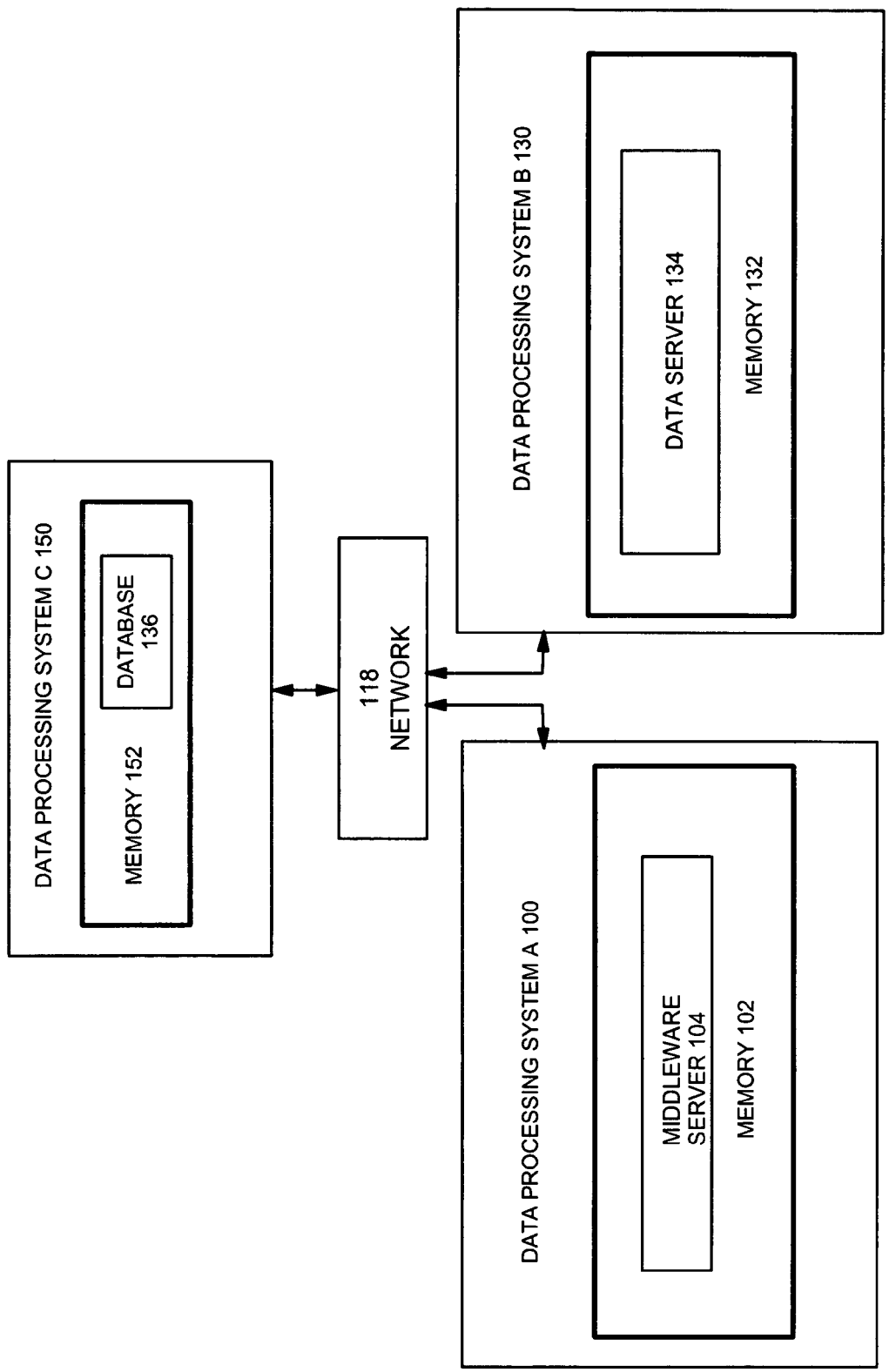

FIG. 1B shows an alternative to storing the database 136 in the memory 132 of the data processing system B 130 of FIG. 1A. The database 136 maybe stored in a memory 152 of a data processing system C 150. The data processing systems A 100, B 130 and C 152 are in operable communication via the network 188.

Figure 2:
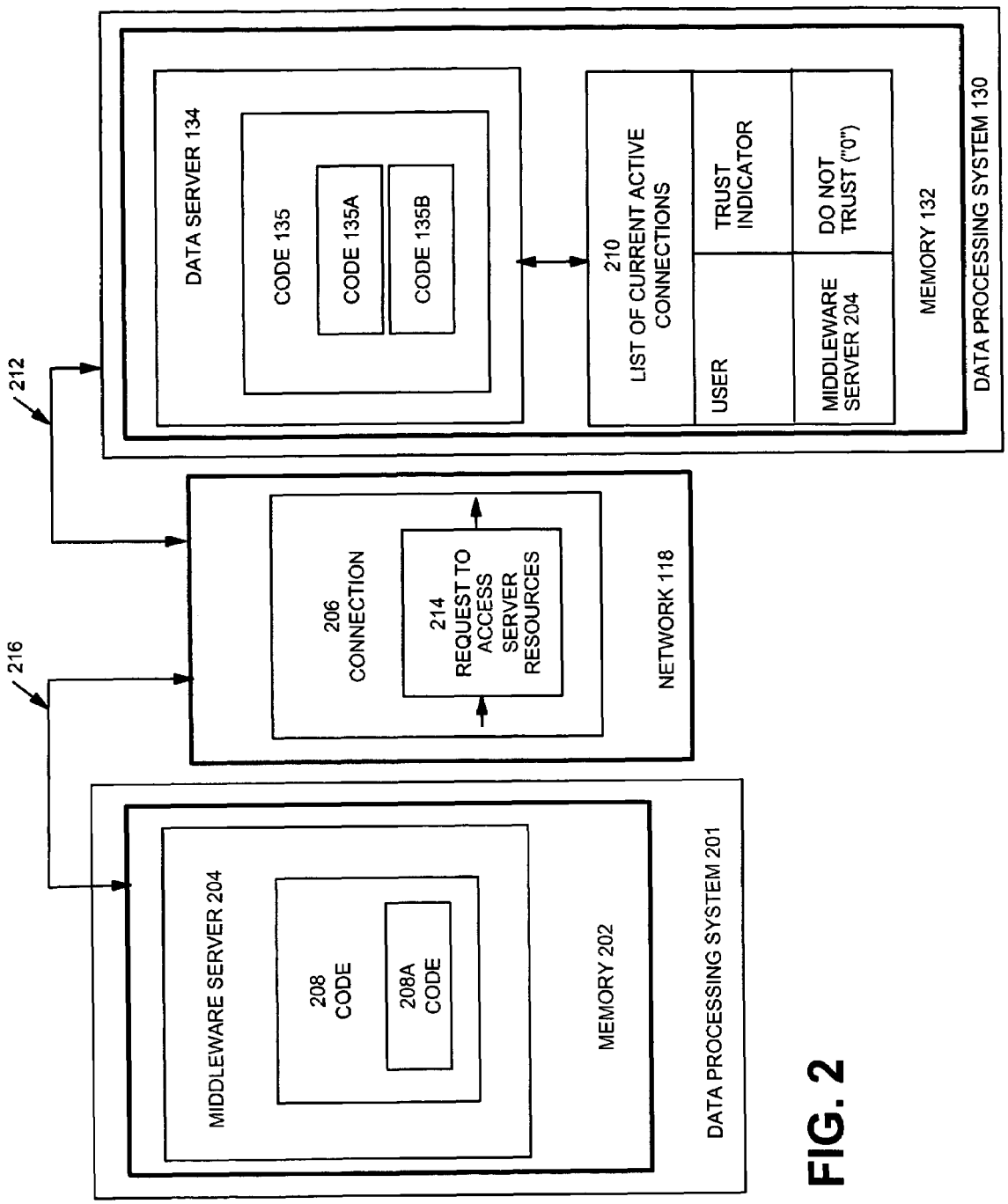
FIG. 2 shows another middleware server attempting to negotiate data with the data server of FIG. 1.

FIG. 2 illustrates another middleware server 204 in communication with the data server 134 via the network 118. The middleware server 204 contains code 208 with a module 208A. The middleware server 204 is located in a memory 202 of a data processing system 201.

The data processing system 201 includes known modules that facilitate communication via the network 118 and is indicated as a connection line 216. Such a connection line 212 is also used to connect the data processing system B 130 with the network 118. The connection lines 216 and 212 are used for establishing a connection 206 (via the network 118) between the data processing system B 130 and the data processing system 201.

The middleware server 204 has not been set up as being trusted on the data server 134 by the data server administrator 152. This may be because an agreement was not previously set between administrators of the data server 134 and the middleware server 204 to govern interactions between these two servers 134 and 204.

The middleware server 204 is attempting to negotiate to obtain data through the data server 134. The code 208 directs a CPU (not illustrated) of the data processing system 201 to establish the connection 206 with the data server 134. Once the connection 206 is established, the code 208 directs the data processing system 201 to issue a request 214 for requesting access to the data associated with the data server 134. The request 214 is sent to the data server 134 via the connection line 216 through the connection 206 and over to the connection line 212.

A list 210 is stored in the memory 132 of the data processing system A 130 indicating currently active connections established with the data server 134. The code 135A directs the data processing system B 130 to update the list 210 in response to the data processing system B 130 establishing a connection with the middleware server 204. Once the connection 206 is set up, the code 135B directs the data processing system B 130 to set a trust indicator in the list 210 to "do not trust" (for example, a bit may be used and set to a value of "0" for this case) because the middleware server 204 has not bee previously registered with the data server 134 as a trusted entity.

The decision to trust or not to trust a requesting middleware server is performed by the data server 134 on the basis of verbal agreements 154 between the database 136 and various middle ware servers that have been registered with the data server 134. Such verbal agreements 154 are registered with the data server 134 by the data server administrator 152 to provide an indication of connections that are to be trusted. This information may be stored in a table that the data server 134 can search each time a request connection is received.

For each connection request received, the data server 134 compares attributes of the connection request (e.g. user id, IP address, etc.) with information stored in the database 136 about the connections that are to be trusted. If there is a match then the current connection is marked as a trusted connection; otherwise, the connection is marked as untrusted.

The data server 134 will establish a connection with the middleware server 204 based on the request; however, that connection will be marked as not trusted because the middleware server 204 has not been registered as trusted on the data server 134. The data server 134 will continue to honor requests from the middleware server 204 but since the connection between these two is not trusted the data server 134 will reject a request from the middleware server 204 to reuse the connection under a different user id without supplying a password. On the other hand, a middleware server that is registered as being trusted with the data server 134 will have requests to reuse the existing connection under a different user granted without requiring that a password be supplied.

Figure 3:
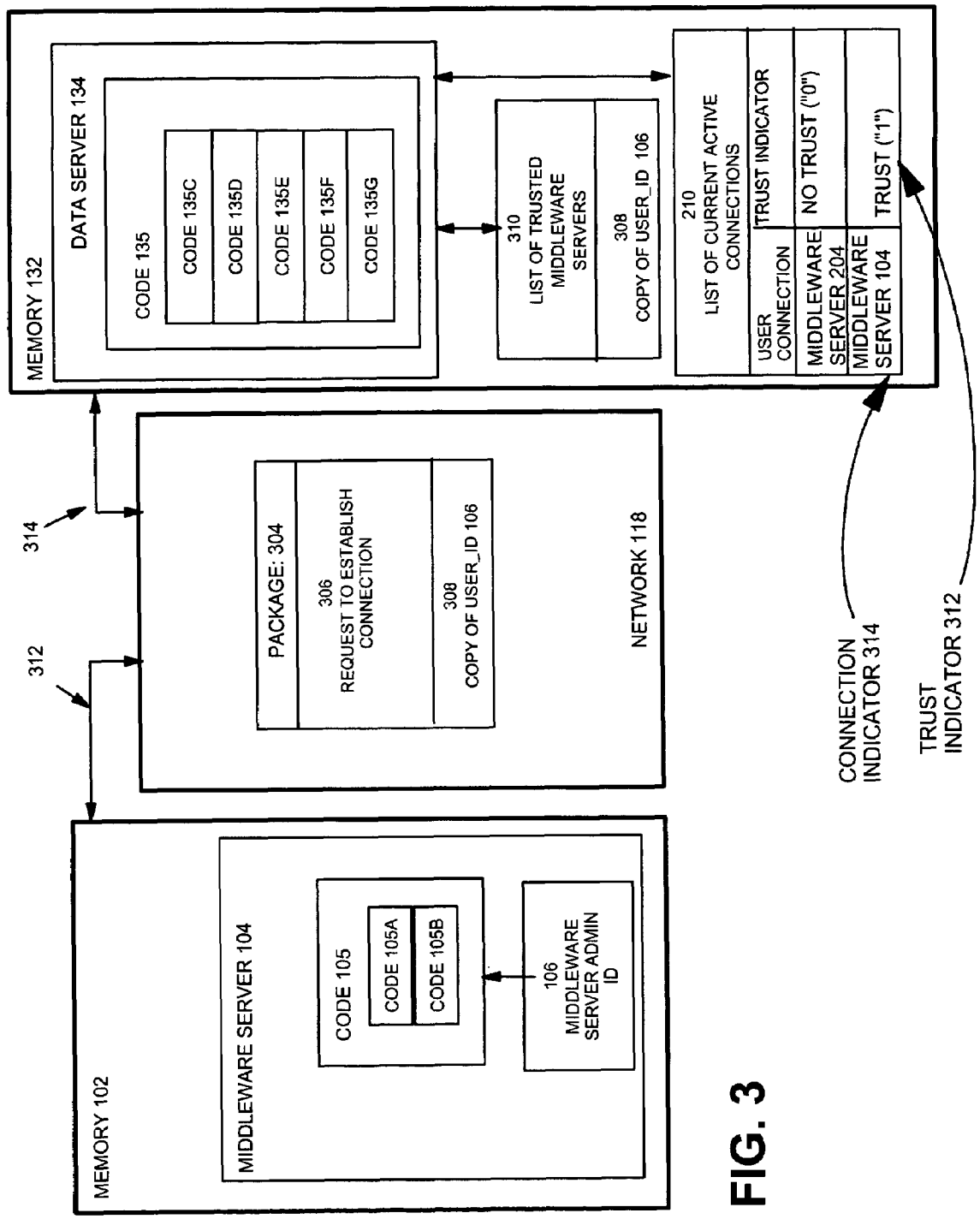
FIG. 3 shows the middle ware server of FIG. 1 attempting to negotiate data with the data server of FIG. 1.

FIG. 3 illustrates a connection between the middleware server 104 and the data server 134 of FIG. 1. The middleware server 104 has a connection line 312 with the network 118 and the data server 134 has a connection line 314 with the network 118. The memory 132 of the data processing system B 130 may include a list 310 of trusted middle ware servers in addition to the data server 134 and the list of current active connections 210. The list 310 of trusted middleware server may also be derived when examining a request by looking at the list 210 and selecting those connections that have a positive trust indicator.

The list 210 of current active connections includes an indication as to whether or not the connection is trusted. A connection is trusted when the data server 134 determines that the connection's source attributes match the attributes of a connection source (i.e. middle ware server) registered in the database 136 as to be trusted.

The middleware server 104 attempts to make a connection with the data server 134. The code 105A directs the middleware server 104 to establish a connection 302 with the data server 134.

The data processing system 100 includes known modules that facilitate communication via the network 118 and is indicated as a connection line 312. Such a connection line 314 is also used to connect the data processing system B 130 with the network 118. The connection lines 312 and 314re used for establishing a connection 302 (via the network 118) between the data processing system B 130 and the data processing system 100.

A request 306 to establish a connection along with a copy 308 of the user id 106 currently associated with the middleware server 104 are sent as a package 304 from the middleware server 104 to the data server 134 via the network 118. There are two possible scenarios for processing of this request by the data server 134: either this is a new connection between the middleware server 104 and the data server 134 or a connection already exists between these two parties and the request contains a request to maintain the connection therebetween using a different user id (and possibly a password).

If the package 304 is for a request for a new connection, then the data server 134 receives the request and authenticates the user id and the password before the connection is established. As part of the authentication process, the data server updates the list 210 of current active connections. The data server 134 then examines attributes of the connection with the middleware server 104 and if such attributes match attributes in the database 136 of a trusted server then the middleware server 104 is identified as being trusted and marks the connection as trusted. Once this is complete, the middleware server 104 can start requesting services from the database 136 through the data server 134 via this connection.

If the package is for a request to maintain a connection with a different user id, then the data server 134 receives the request and examines the list 210 to determine if the middleware server 104 is a trusted connection. If the existing connection between the middleware server 104 and the data server 134 is trusted then the current connection between the parties is maintained with the different user id without requiring a password associated with the different user id; otherwise, a password is required and the connection can be broken.

The connection source attributes in the database 136 may indicate that all connections from a particular source are to be trusted, irregardless of the user id. Alternatively, the connection source attributes may indicate only specific user ids that may be interchanged on a trusted connection without the requirement of a password, other user ids from the same source may require passwords.

Figure 4:
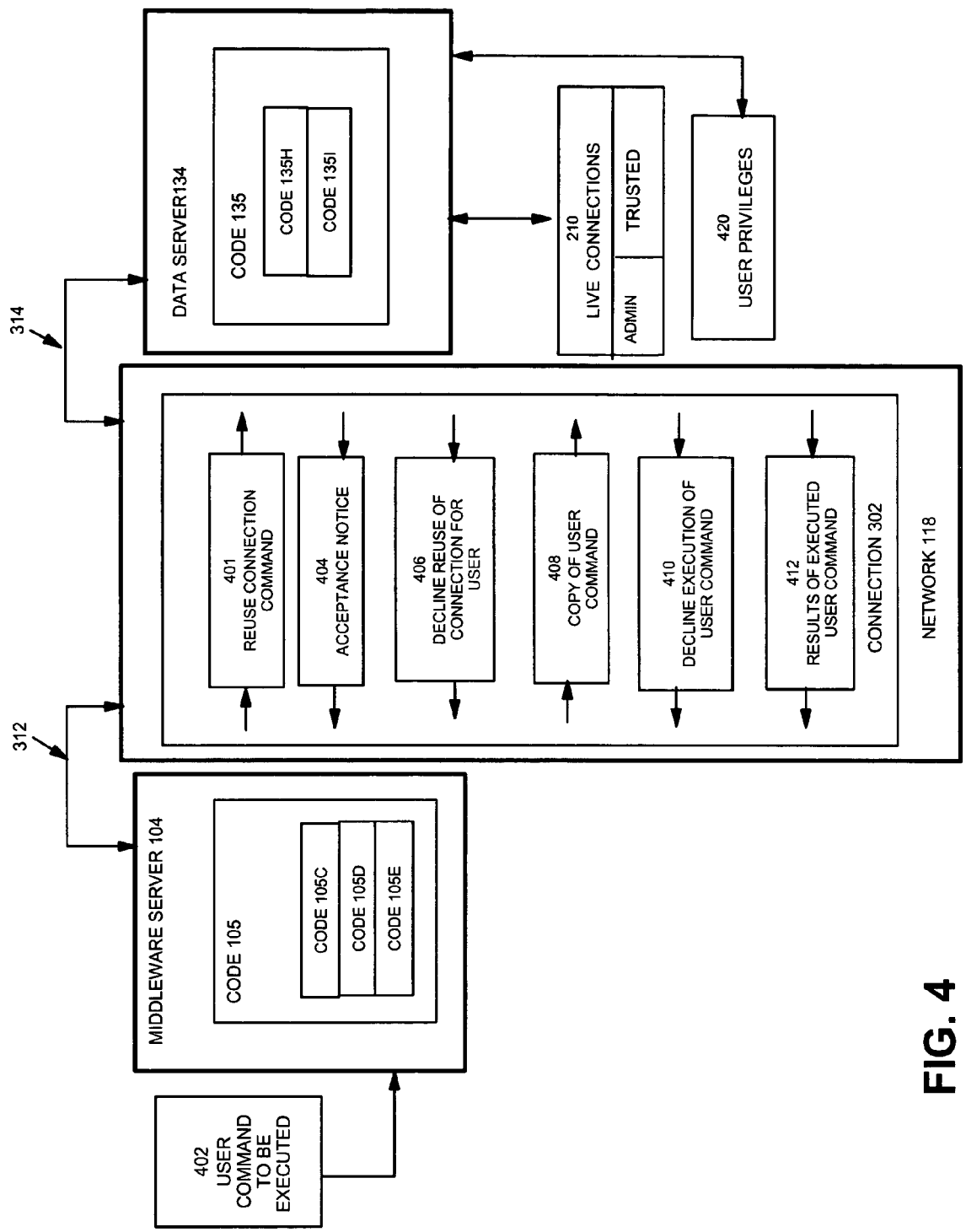
FIG. 4 shows a response taken by the middleware server and the data server of FIG. 1 when a user command requests a copy of data from the data server 134.

FIG. 4 illustrates a situation when a user command 402 is received by the middleware server 104 requesting a copy of data from the data server 134.

In response to receiving the user command 402, the code 105C directs the middleware server 104 to transmit a reuse connection command 401 to the data server 134 via the established connection 302. The connection 302 shows a copy of the reuse connection command 401 which is then received by the data server 104.

In response to the data server 134 receiving the reuse connection command 401, the code 135H directs the data server 134 to determine whether to reuse the established connection 302 for executing the user command 402 received by the middleware server 104. The code 135H may direct the data server 134 to issue a notice indicating that the established connection 302 may be reused for executing the user command 402 submitted by the middleware server 104 if the trusted indicator (as shown in table 210) indicates that the middleware server 104 may be trusted. If the middleware server 104 may be trusted, the code 135H may direct the data server 134 to transmit an acceptance notice 404 to the middleware server 104 via connection 302. The code 135H may direct the data server 134 to decline executing the user command 402 received by the middleware server 104 if the trusted indicator (as shown in table 210) indicates that the middleware server 134 may not be trusted. If the middleware server 104 is not to be trusted, the code 135H may direct the data server 134 to transmit a decline notice (to the middleware server 104) for declining the reuse of the connection 302 for the user command 402.

In response to receiving the acceptance notice 404, the code 105D may direct the middleware server 104 to transmit the user command 402 to the data server 134 (via connection 302); thus, the connection 302 is reused for transmitting the user command to the data server 134. In response to receiving the decline notice, the code 105D may direct an error message (not shown) to the user who submitted the user command 402 indicating that the user command 408 for requesting data access was declined by the data server 134.

In response to the data server 134 receiving a copy of the user command 408 from the middleware server 104, the code 135I directs the data server 134 to receive the copy of the user command 408, and then to execute the user command 408.

In an alternative, before the data server 134 executes the user command 408, the code 135I may direct the data server 143 to determine whether the user associated with the user command 408 has predetermined data access privileges (for accessing the data being requested) that were previously established with the data server 134. For example, the data server 134 may decline execution of the user command 408 because the data server 134 determines that the user as no predetermined access rights established for accessing that data identified in the user command 408. In this case, the data server 134 transmits a decline execution notice 410 to the middleware server 104. For the case when the data server 134 determines that the user is associated with access privileges with the data, the data server 134 may execute the user command 408 to access the data stored in the database 136, then the data server 134 transmits the accessed data 412 via connection 302 over to the middleware server 104.

In response to receiving the decline notice 410 declining access to data, the code 105E directs the middleware server 104 to transmit an error message (not shown) to the user. In response to receiving the accessed data 412, the code 105E directs the middleware server 104 to transmit the accessed data 412 to the user.

Figure 5:
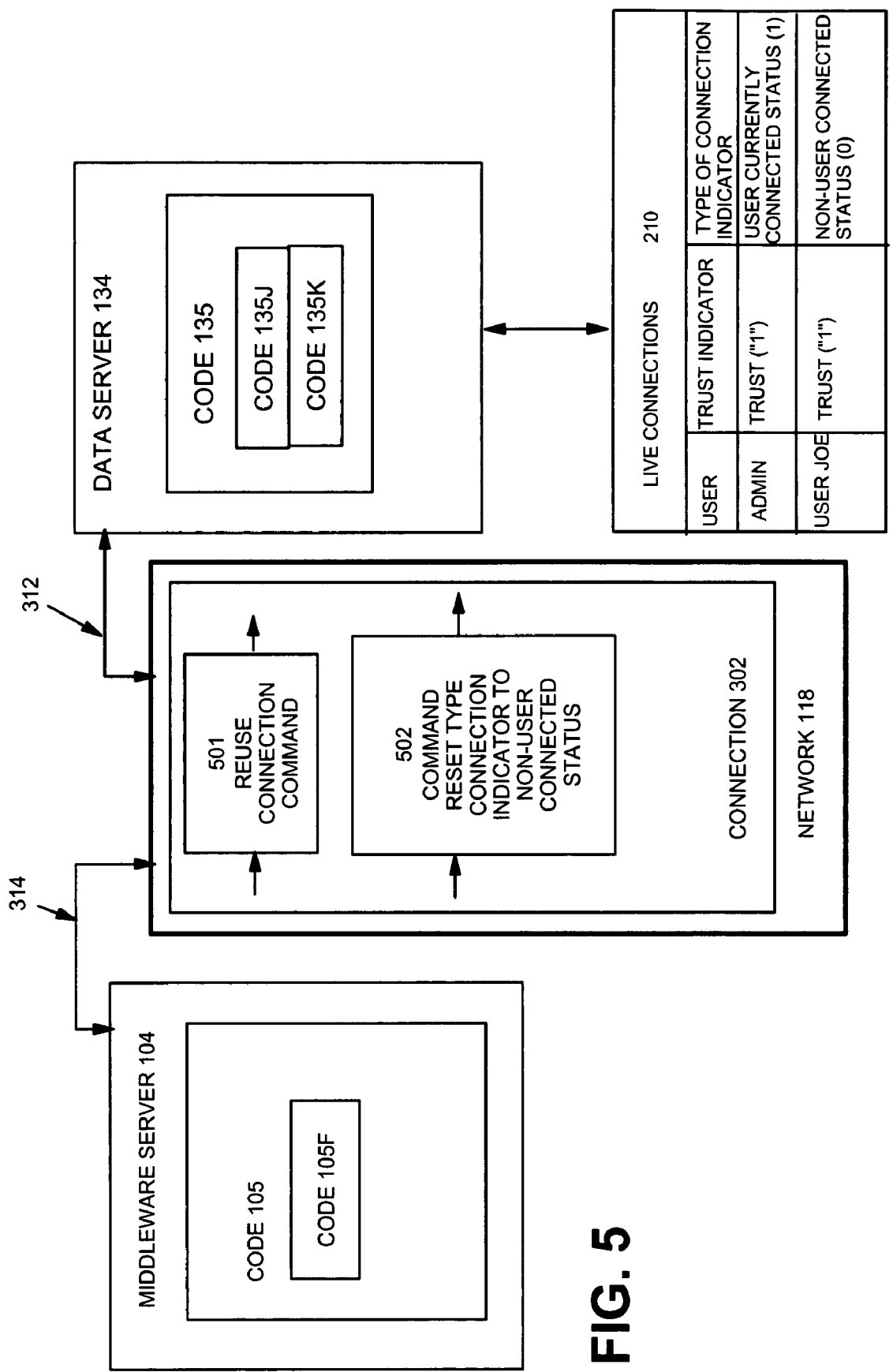
FIG. 5 shows interaction between the middleware server and the data server of FIG. 1 when another user attempts to send a command requesting data servable by the data server.

FIG. 5 shows an interaction between the data server 134 and the middleware server of FIG. 1 when another user attempts to send a command from the middleware server 104 for accessing data via by the data server 134. The code 105 includes the code 105F. The code 135 includes the code 135J and the code 135K.

In response to receiving a release signal from the user, the code 105F directs the middleware server 104 to transmit a type of connection reset command 501 to the data server 134. The reused connection command 501 is shown in the connection 302.

In response to receiving the reused connection command 501 via the established connection 302, the code 135J directs the data server 134 to set a type of connection indicator of user to indicate that the user is currently connected. For example, the data server 134 may set the user ID to the name of the current user of the connection. Once the user has completed using the connection 302, the user may wish to either request more data from the data server 134 or reset the type of connection indicator which permits other users to interact with the data server 134.

In response to receiving a release indicator from the user, the code 105F directs the middleware server 104 to transmit a type of connection reset command 502 to the data server 134 via the established connection 302.

The code 135J, in response to the data server 134 receiving the type of connection reset command 502 via the connection 502, directs the data server 134 to permit another user to use the connection 302. The table 210 contains indications for each user id of the trust and use status; for example, the non-user status connection indicator is "1" (which indicates the user JOE is reusing the connection 302), and the user status connection indicator is set to "0" to indicate that the administrator 150 of the MDW_(W) 104 is not using the connection 302. This arrangement provides a mechanism which permits user JOE exclusive channel to submit user commands to the data server 134.

In response to receiving the reset command 502 from the middleware server 104 via the connection 302, the code 135K directs the data server 134 to set the type of connection indicator to indicate a non-user connection status, which includes setting the currently connected status to of user ID=Admin (the administrator 152) to "1" (the "1" indicates the administrator has control of the connection 302), and setting the currently connected status of user JOE to "0" (the "0" indicates that user JOE is no longer the active user using the connection 302). Now another user of the middleware server may reuse the connection 302.

Figure 6:
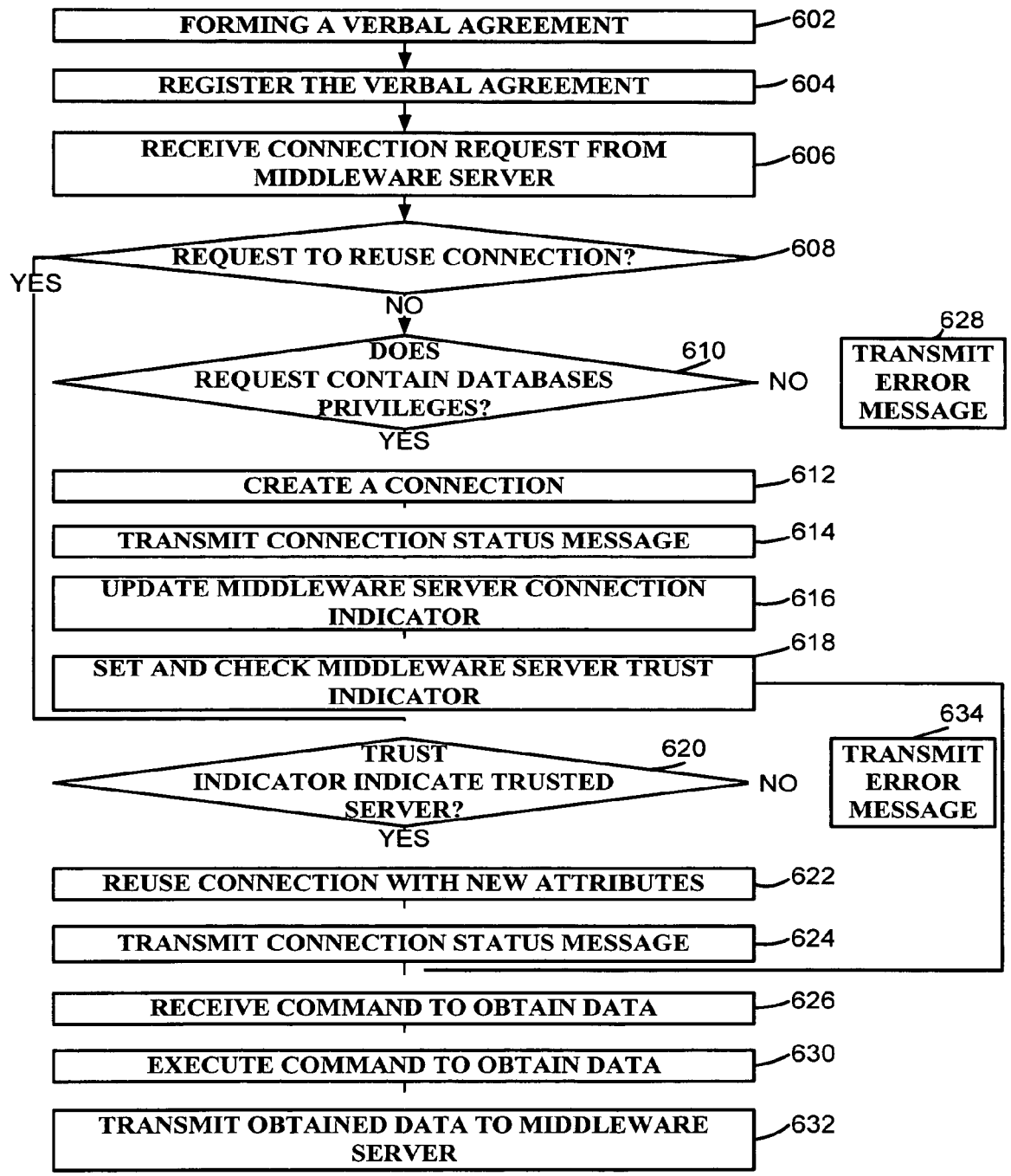
FIG. 6 illustrate a method of managing connections with the middleware server for the data server.

FIG. 6 illustrates a method 600 for the data server 134 of managing a connection with a middleware server. A verbal agreement is formed between the middleware server and the data server in step 602. The verbal agreement indicates whether or not the data server will trust the middleware server and to what degree the middleware server will be trusted. This verbal agreement is then registered with the data server in step 604.

A connection request is received from the middleware server in step 606. The connection request includes request attributes such as whether the request is for a new connection or a reuse of an existing connection, a user identification (and possibly password) for a user of the middleware server, an IP address for the middleware server, etc. In step 608 the request attributes are examined to determine if the request is a reuse of an existing connection using different attributes (e.g. different user identification). If the request is not to reuse the connection then it is a request for a new connection.

The request for a new connection is examined in step 610 to determine if the request attributes contain access privileges for the database (e.g. does the user identification and password match a user id and password registered in the database). If the request contains access privileges, then a connection between the data server and the middleware server is created in step 612. A connection status message is transmitted to the middleware server in step 614 indicating that the connection was established. A connection indicator is updated in step 616 to indicate that the middleware server is connected with the data server. A trust indicator is then set and checked for the middleware server in step 618. Based on attributes of the middleware server in the request (e.g. IP address) and attributes of servers that can be trusted (as found in the registered verbal agreement), the trust indicator is set as 'trust' or 'not trust' for the middleware server.

If the connection request for a new connection does not contain database access privileges then an error message is transmitted to the middleware server in step 628.

If the connection request is to reuse a connection then the trust indicator for the middleware server is examined in step 620. If the trust indicator indicates that the middleware server is not a trusted server then an error message is transmitted to the middleware server in step 634.

If the trust indicator indicates that the middleware server is a trusted server then the connection may be reused with new attributes. These new attributes are set for the connection in step 622. A connection status message is transmitted to the middleware server in step 624 indicating that the connection is being reused with the new attributes.

After a new connection has been established or the existing connection is set up to be reused, a command to obtain data from the data base is received from the middleware server in step 626. The command to obtain data is executed in step 630 and the obtained data is transmitted to the middleware server in step 632.

Figure 7:
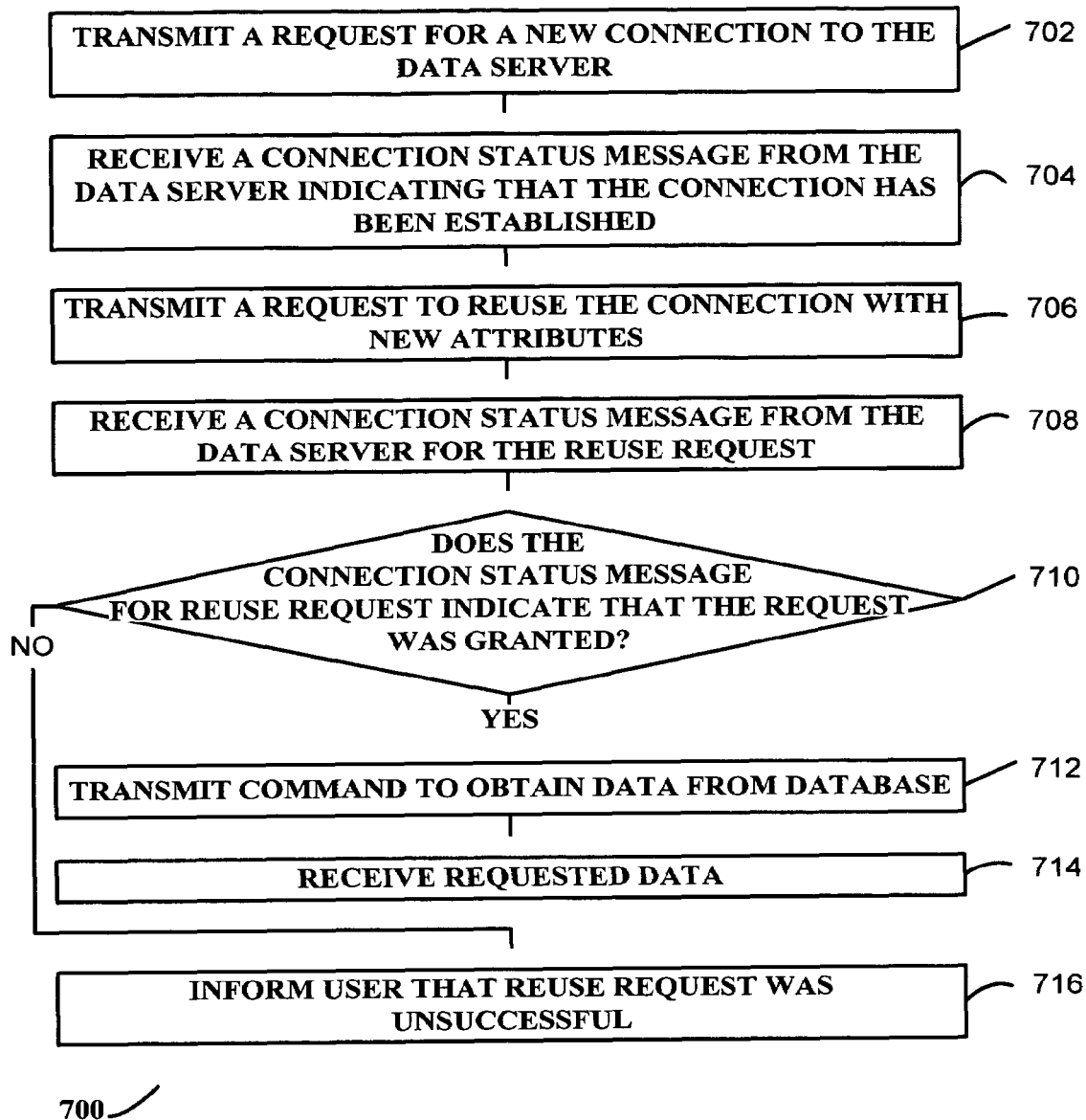
FIG. 7 illustrates a method of establishing a connection with the data server for the middleware server.

FIG. 7 illustrates a method 700 of establishing a connection with the data server by the middleware server. A request for a new connection is transmitted from the middleware server to the data server instep 702. A connection status message is received from the data server in step 704 indicating whether or not the connection has been established.

After a connection has been established a request to reuse the connection with different attributes 9e.g. different user id) is transmitted to the data server in step 706. A connection status message is received form the data server in step 708 indicating whether or not the request to reuse the connection was granted.

The connection status message is examined in step 710 to determine if the request to reuse the connection was granted. If the request was not granted then a user is informed in step 716 that the request was unsuccessful.

If the request was successful then a command to obtain data from the database is transmitted to the data server in step 712. The requested data is received form the data server in step 714.

The detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention.

The invention claimed is:

1. For a data server of a data processing system operably coupled to a database, a method of managing a connection with a middleware server, the middleware server sending a request for a connection to the data server, the request comprising request attributes, the method comprising:
   storing a set of attributes identifying middleware servers trusted by the data server;
   establishing a connection between the middleware server and the data server based on a request, having connection request attributes, received from the middleware server; and
   setting a trust indicator for the connection, according to a trust status determined by comparing the set of attributes identifying the middleware server to the received connection request attributes, the trust status indicating whether the connection is one of a trusted connection and a non-trusted connection,
   wherein if the connection between the middleware server and the data server is a trusted connection, the data server permits use of the connection by the middleware server when a first user is connected to the middleware server and permits reuse of the connection by the middleware server when a second user, different from the first user, is connected to the middleware server without requiring authentication of the second user.

2. The method of claim 1, wherein the step of establishing a connection comprises:
   updating a connection indicator after the connection has been established to indicate that the connection has been established.

3. The method of claim 2, wherein the step of setting a trust indicator comprises:
   determining if the trust indicator is set for the connection; and
   if the trust indicator is set, determining whether the connection is trusted after the connection indicator indicates the connection is established.

4. The method of claim 1 wherein the step of storing comprises:
   forming an agreement between the data server and the middleware server containing the set of attributes; and
   registering the set of attributes with the data server.

5. The method of claim 1 wherein the step of establishing a connection comprises:
   receiving a request from the middleware server to establish a connection therebetween; and
   determining whether the request attributes indicate a request for a new connection or a reuse of an existing connection with different request attributes.

6. The method of claim 5 wherein the step of establishing a connection further comprises:
   determining if the request attributes include access privileges for the database if the request attributes indicate a request for a new connection;
   creating the connection if the request attributes include access privileges; and
   transmitting a connection status message to the middleware server indicating that the connection has been established.

7. The method of claim 5 wherein the request attributes comprises a user identification and the different request attributes comprises a different user identification.

8. The method of claim 7, wherein the step of establishing the connection further comprises:
   determining whether the existing connection can be reused based on the trust indicator of the existing connection.

9. The method of claim 8, wherein the step of determining whether the existing connection can be reused comprises:
   transmitting a connection status message to the middleware server indicting that the connection may be reused if the trust indicator indicates that the middleware server is trusted.

10. The method of claim 8, wherein the step of determining whether the existing connection can be reused comprises:
    transmitting a connection status message to the middleware server indicating that the existing connection may not be reused if the trust indicator indicates that the middleware server is not trusted.

11. The method of claim 1 further comprising:
    receiving a command via the connection for obtaining data in the database from the middleware server; and
    executing the command in the request if the trust indicator for the middleware server indicates that the middleware server is trusted.

12. The method of claim 11, wherein the step of executing comprises:
    transmitting a decline execution notice to the middleware server if the request attributes do not include access privileges for the data identified in the command; and
    transmitting obtained data to the middleware server in response to the command if the request attributes include access privileges for the data identified in the command.

13. The method of claim 1, wherein the middleware server receives the request for connection to the data server from a user connected to the middleware server over a network.

14. The method of claim 1, wherein the connection request attributes comprise attributes of a user connected to the middleware server and attributes of the middleware server.

15. The method of claim 1, wherein the trust indicator is stored at the data server.

16. The method of claim 1, wherein the storing the set of attributes identifying middleware servers trusted by the data server occurs prior to the establishing the connection between the middleware server and the data server based on the request.

17. For a middleware server of a data processing system, a method of establishing a connection with a data server operably coupled to a database, the method comprising:
    transmitting a connection request to the data server, the connection request having request attributes that identify the connection request as being one of a new connection and reuse of an existing connection having different connection request attributes; and
    receiving a connection status message from the data server indicating a status, when the data server determines that the middleware server is one of a trusted middleware server and a non-trusted middleware server by comparing the request attributes to a stored set of attributes identifying the middleware server, of the connection as being one of a trusted connection and a non-trusted connection,
    wherein if the connection between the middleware server and the data server is a trusted connection, the data server permits use of the connection by the middleware server when a first user is connected to the middleware server and permits reuse of the connection by the middleware server when a second user, different from the first user, is connected to the middleware server without requiring authentication of the second user.

18. The method of claim 17, wherein the step of transmitting a connection request comprises:
   transmitting the connection request with the request to reuse the existing connection to the data server via the existing connection,
   wherein the request attributes comprises a user identification and the different request attributes comprises a different user identification than the existing connection.

19. The method of claim 17, further comprising:
   transmitting a command for obtaining data in the database to the data server if the connection status message indicates that the connection has been established.

20. The method of claim 19 further comprising:
   receiving obtained data from the data server in response to the command.

21. For a data server of a data processing system operably coupled to a database, a computer program product having computer executable codes embodied on a computer-readable storage medium for managing a connection with a middleware server, the middleware server sending a request for a connection to the data server, the request comprising request attributes, the computer program product comprising:
   code storing a set of attributes identifying middleware servers trusted by the data server;
   code establishing a connection between the middleware server and the data server based on the request received from the middleware server; and
   code setting a trust indicator for the connection according to a trust status determined by comparing the set of attributes identifying the middleware server to the received connection request attributes, the trust status indicating whether the connection is one of a trusted connection and a non-trusted connection,
   wherein if the connection between the middleware server and the data server is a trusted connection, the data server permits use of the connection by the middleware server when a first user is connected to the middleware server and permits reuse of the connection by the middleware server when a second user, different from the first user, is connected to the middleware server without requiring authentication of the second user.

22. The computer program product of claim 21, wherein the code establishing a connection comprises:
   code updating a connection indicator after the connection has been established to indicate that the connection has been established.

23. The computer program product of claim 22, wherein the code setting a trust indicator comprises:
   code determining if the trust indicator is set for the connection; and
   code, if the trust indicator is set, determining whether the connection is trusted after the connection indicator indicates the connection is established.

24. The computer program product of claim 21, wherein the code storing comprises:
   code forming an agreement between the data server and the middleware server containing the set of attributes; and
   code registering the set of attributes with the data server.

25. The computer program product of claim 21, wherein the code establishing a connection comprises:
   code receiving a request from the middleware server to establish a connection therebetween; and
   code determining whether the request attributes indicate a request for a new connection or a reuse of an existing connection with different request attributes.

26. The computer program product of claim 25, wherein the code establishing a connection further comprises:
   code determining if the request attributes include access privileges for the database if the request attributes indicate a request for a new connection;
   code creating the connection if the request attributes include access privileges; and
   code transmitting a connection status message to the middleware server indicating that the connection has been established.

27. The computer program product of claim 25, wherein the request attributes comprises a user identification and the different request attributes comprises a different user identification.

28. The computer program product of claim 27, wherein the code establishing the connection further comprises:
   code determining whether the existing connection can be reused based on the trust indicator of the existing connection.

29. The computer program product of claim 28, wherein the code determining whether the existing connection can be reused comprises:
   code transmitting a connection status message to the middleware server indicting that the connection may be reused if the trust indicator indicates that the middleware server is trusted.

30. The computer program product of claim 28, wherein the code determining whether the existing connection can be reused comprises:
   code transmitting a connection status message to the middleware server indicating that the existing connection may not be reused if the trust indicator indicates that the middleware server is not trusted.

31. The computer program product of claim 21, further comprising:
   code receiving a command via the connection for obtaining data in the database from the middleware server; and
   executing the command in the request if the trust indicator for the middleware server indicates that the middleware server is trusted.

32. The computer program product of claim 31, wherein the step of executing comprises:
   code transmitting a decline execution notice to the middleware server if the request attributes do not include access privileges for the data identified in the command; and
   code transmitting obtained data to the middleware server in response to the command if the request attributes include access privileges for the data identified in the command.

33. For a middleware server of a data processing system, a computer program product having computer executable codes embodied on a computer-readable storage medium for establishing a connection with a data server operably coupled to a database, the computer program product comprising:
   code transmitting a connection request to the data server, the connection request having request attributes that identify the connection request as being for one of a new connection and reuse of an existing connection having different connection request attributes; and
   code receiving a connection status message from the data server indicating a status, when the data server determines that the middleware server is one of a trusted middleware server and a non-trusted middleware server by comparing the request attributes to a stored set of attributes identifying the middleware server, of the connection as being one of a trusted connection and a non-trusted connection, wherein if the connection between the middleware server and the data server is a trusted connection, the data server permits use of the connection by the middleware server when a first user is connected to the middleware server and permits reuse of the connection by the middleware server when a second user, different from the first user, is connected to the middleware server without requiring authentication of the second user.

34. The computer program product of claim 33, wherein the code transmitting a connection request comprises:

code transmitting the connection request with the request to reuse the existing connection to the data server via the existing connection, wherein the request attributes comprises a user identification and the different request attributes comprises a different user identification than the existing connection.

35. The computer program product of claim 33, further comprising:

code transmitting a command for obtaining data in the database to the data server if the connection status message indicates that the connection has been established.

36. The computer program product of claim 35, further comprising:

code receiving obtained data from the data server in response to the command.

* * * * *

UNITED STATES PATENT AND TRADEMARK OFFICE
CERTIFICATE OF CORRECTION

PATENT NO. : 7,647,626 B2
APPLICATION NO. : 11/008507
DATED : January 12, 2010
INVENTOR(S) : Bird et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

Sixteenth Day of November, 2010

David J. Kappos
*Director of the United States Patent and Trademark Office*